United States Patent
Yuan

(10) Patent No.: US 8,259,999 B2
(45) Date of Patent: Sep. 4, 2012

(54) APPARATUS AND METHOD FOR DETECTING MOVEMENT DIRECTION OF OBJECT

(75) Inventor: Kun-I Yuan, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 437 days.

(21) Appl. No.: 12/629,975

(22) Filed: Dec. 3, 2009

(65) Prior Publication Data

US 2010/0303292 A1  Dec. 2, 2010

(30) Foreign Application Priority Data

May 27, 2009 (CN) .......................... 2009 1 0302690

(51) Int. Cl.
*G06K 9/00* (2006.01)
*G11B 7/00* (2006.01)

(52) U.S. Cl. ..................... 382/103; 382/291; 369/112.11

(58) Field of Classification Search .................. 382/100, 382/103–107, 168, 173, 181, 191–194, 199, 382/209, 219, 232, 254, 255, 274, 291, 305, 382/312; 348/335; 369/112.07, 112.11, 369/112.01; 359/680, 686; 396/72
See application file for complete search history.

(56) References Cited

U.S. PATENT DOCUMENTS

| | | | | |
|---|---|---|---|---|
| 6,088,059 A | * | 7/2000 | Mihara et al. | 348/335 |
| 6,931,207 B2 | * | 8/2005 | Nanba | 396/72 |
| 7,440,381 B2 | * | 10/2008 | Kimura et al. | 369/112.01 |
| 7,639,589 B2 | * | 12/2009 | Saito et al. | 369/112.11 |
| 7,791,817 B2 | * | 9/2010 | Shirota | 359/686 |
| 8,121,011 B2 | * | 2/2012 | Kimura et al. | 369/112.07 |
| 8,130,452 B2 | * | 3/2012 | Shirota | 359/680 |

* cited by examiner

*Primary Examiner* — Seyed Azarian
(74) *Attorney, Agent, or Firm* — Altis Law Group, Inc.

(57) ABSTRACT

An apparatus for detecting movement direction of object, includes a converging lens, an image sensor and an image processor. The converging lens has an axial chromatic aberration between a first and a second rays in different wavelengths. The image sensor is for receiving and converting the first and second rays into first and second electronic image signals associated with the object. The image processor is configured for analyzing whether the object is closer to an object plane associated with the first ray or closer to an object plane associated with the second ray when the object moves to different positions, and determining the movement direction of the object based on the analyzed positions of the object relative to the object plane associated with the first ray and the object plane associated with the second ray.

4 Claims, 1 Drawing Sheet

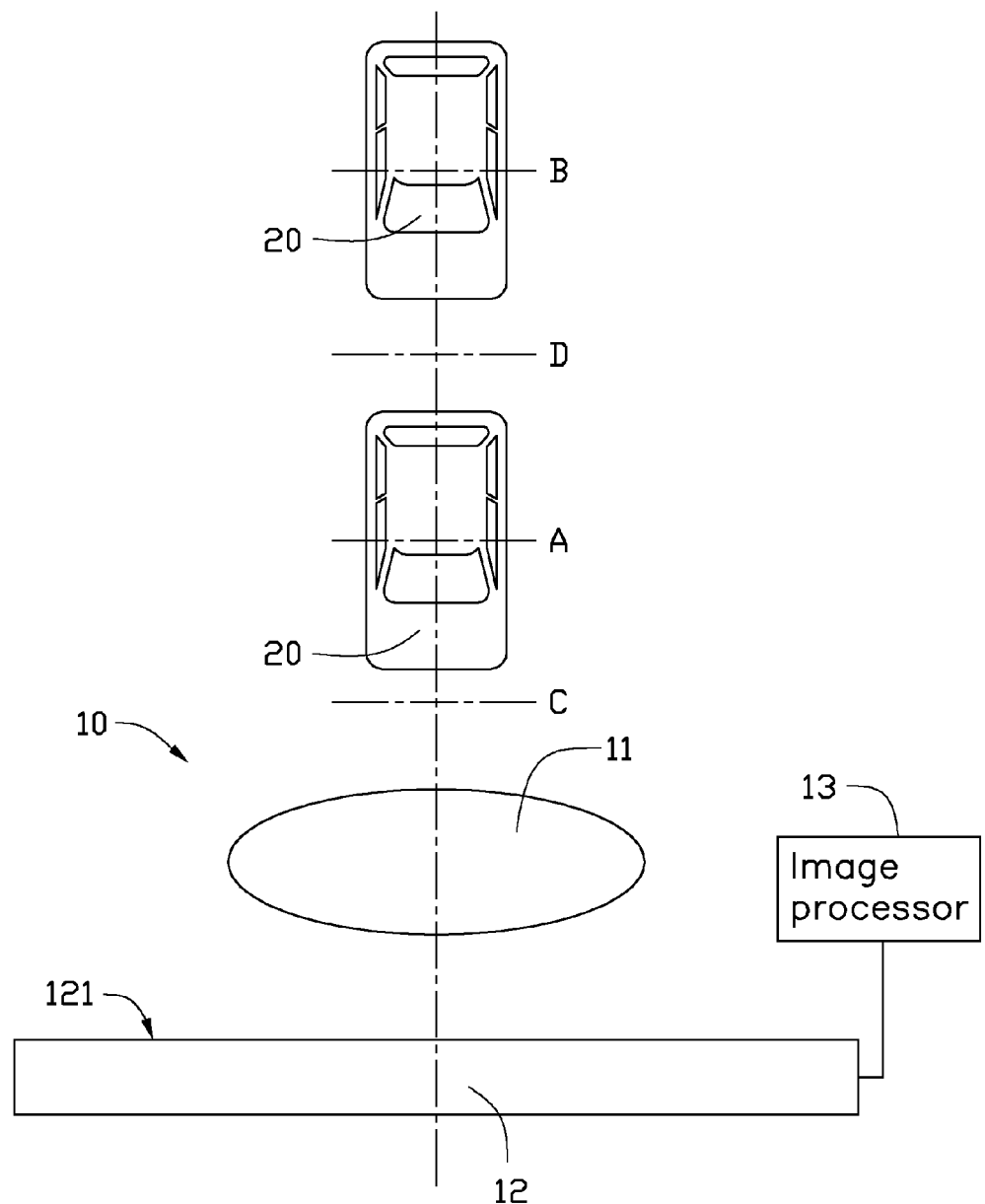

APPARATUS AND METHOD FOR DETECTING MOVEMENT DIRECTION OF OBJECT

CROSS-REFERENCE TO RELATED APPLICATION

This application is related to a commonly-assigned co-pending application entitled "IMAGE SENSOR, APPARATUS AND METHOD FOR DETECTING MOVEMENT DIRECTION OF OBJECT" Ser. No. 12/629,976. The above-identified application is filed simultaneously with the present application. The disclosure of the above-identified application is incorporated herein by reference.

BACKGROUND

1. Technical Field

The present disclosure relates to an apparatus for detecting a movement direction of an object, and a method for detecting same using the apparatus.

2. Description of Related Art

Object movement detection is proposed to be applied in a variety of fields, such as operations of three dimensional (3D) games and image captures. With the help of the object movement detection, real-time operations of the 3D games and the image captures can be achieved.

A method which has been used for detecting movement of an object, includes steps of emitting infrared rays to the object using an emitter, receiving the infrared rays reflected by the object using a receiver, and obtaining the movement of the object based on the time lasted in the receiving of the infrared rays and the quantities of the infrared rays received.

However, as the object can also emit out infrared rays which interfere with the infrared rays emitted by the emitter, the above-described method may not accurately detect movement of the object.

What is needed, therefore, is an apparatus and a method for detecting a movement direction of an object, which can overcome the above shortcomings.

BRIEF DESCRIPTION OF THE DRAWINGS

Many aspects of the present apparatus and method can be better understood with reference to the following drawings. The components in the drawings are not necessarily drawn to scale, the emphasis instead being placed upon clearly illustrating the principles of the present apparatus and method. Moreover, in the drawings, like reference numerals designate corresponding parts throughout the several views.

FIG. 1 is a schematic view of an apparatus for detecting a movement direction of an object, in accordance with an embodiment.

DETAILED DESCRIPTION

Embodiments of the present apparatus and method will now be described in detail below and with reference to the drawings.

Referring to FIG. 1, an exemplary apparatus 10 for detecting a movement direction of an object 20, is shown. The apparatus 10 includes a lens 11, an image sensor 12 and an image processor 13.

The lens 11 is a converging lens. The lens 11 has an axial chromatic aberration between a first ray and a second ray in different wavelengths. That is, the first and the second rays would not be converged at a same point after being transmitted through the lens 11 due to the different wavelengths. In the present embodiment, the first ray is a blue light ray with a shorter wavelength, and the second ray is a red light ray with a longer wavelength. In operation, the blue light ray and the red light ray can also be provided by a visual light which may includes red, orange, yellow, green, blue, indigo and violet light rays, and a filter (not shown) can be added in the apparatus 10 to filter out other light rays.

The image sensor 12 has a flat sensing surface 121 facing the lens 11. The flat sensing surface 121 is spaced the certain distance from the lens 11, and is configured for receiving the first and second rays. In operation, under the first ray and the second ray, the image sensor 11 would form a first ray image and a second ray image associated with the object 20 respectively corresponding to the first and second rays, and when the image sensor 12 is spaced a certain distance from the lens 11, one of the first and second ray images will be clearer than the other one of the first and second ray images. The image sensor 12 can convert the first ray image and the second ray image into a first and a second electronic image signals which can be received by the image processor 13.

Due to the different wavelengths, refractive degrees of the first and the second rays in the lens 11 are different. In particular, the shorter the wavelength is, the greater the refractive degree is, and the longer the wavelength is, the smaller the refractive degree is. The greater the refractive degree is, the shorter a focal length is. According to this principle, in the present embodiment, the focal length of the first rays through out the lens 11 is shorter than the focal length of the second rays through out the lens 11. Suppose that the certain distance between the lens 11 and the flat sensing surface 121 is an image distance for both the first and second rays, i.e., the flat sensing surface 121 is located at an imaging plane (after focal plane) of both the first and second rays. According to the optical formula $1/u+1/v=1/f$ (wherein u represents an object distance, v represents an image distance, and f represents a focal length), an object distance of the first rays corresponding to the image distance is shorter than an object distance of the second rays corresponding to the image distance. In the present embodiment, suppose that the plane C is the object plane of the first rays, the plane D is the object plane of the second rays.

The image processor 13 is electrically connected to the image sensor 12, and receives the first and second electronic image signals. The image processor 13 is capable of evaluating degree of clarity of each of the first and second electronic image signals, thereby analyzing image quality of the first and second electronic image signals. In particular, when the object 20 is located at the object plane C, the first electronic image signal is clear, and the second electronic image signal is not so clear; and when the object 20 is located at the object plane D, the second electronic image signal is clear, and the first electronic image signal is not so clear.

In operation, under the first and second rays, when the object 20 is located at a position A, a first ray image and a second ray image associated with the object 20 corresponding to the first rays and the second rays are formed on the image sensor 12, and then a first electronic image signal corresponding to the first ray image and a second electronic image signal corresponding to the second ray image are received by the image processor 13. Next, the image quality of each of the first and second electronic image signals is analyzed to determine if the position A is closer to the object plane C or closer to the object plane D. Understandably, if the first electronic image signal is clearer than the second electronic image signal, then the position A is more closer to the object plane C than the object plane D. In other words, the first ray image has a higher degree of clarity than the second ray image. If the second electronic image signal is clearer than the first electronic image signal, then the position A is more closer to the object plane D than the object plane C.

Next, when the object 20 is located at a position B, a third ray image and a fourth ray image associated with the object 20 corresponding to the first rays and the second rays are formed on the image sensor 12, and then a third electronic image signal corresponding to the third ray image and a fourth electronic image signal corresponding to the fourth ray image are received by the image processor 13. Next, the image quality of each of the third and fourth electronic image signals is analyzed to determine if the position B is closer to the object plane C or closer to the object plane D. Understandably, if the third electronic image signal is clearer than the fourth electronic image signal, then the position B is more closer to the object plane C than the object plane D. In other words, the third ray image has a higher degree of clarity than the fourth ray image. If the fourth electronic image signal is clearer than the third electronic image signal, then the position B is more closer to the object plane D than the object plane C.

According to the above-described method, at the first time, if the image quality of the first electronic image signal is clearer than the image quality of the second electronic image signal, it means that the object 20 at this time (also the position A) is closer to the object plane C than the object plane D; if the image quality of the second electronic image signal is clearer than the image quality of the first electronic image signal, it means that the object 20 at this time (also the position A) is closer to the object plane D than the object plane C. At the second time, if the image quality of the third electronic image signal is clearer than the image quality of the fourth electronic image signal, it means that the object 20 at this time (also the position B) is closer to the object plane C than the object plane D; if the image quality of the fourth electronic image signal is clearer than the image quality of the third electronic image signal, it means that the object 20 at this time (also the position B) is closer to the object plane D than the object plane C. In particular, at the first time and the second time, if the object 20 (also both the positions A and B) is/are closer to the same object plane C, the image qualities of the first electronic image signal and third electronic image signal can be further compared to obtain at which time the object 20 is further closer to the object plane C; if the object 20 (also both the positions A and B) is/are closer to the same object plane D, the image qualities of the second electronic image signal and fourth electronic image signal can be further compared to obtain at which time the object 20 is further closer to the object plane D With the above-described configuration and method, under the references of the object planes C and D, a relation between the position A and the position B can be obtained, thus a movement direction of the object 20 relative to the apparatus 10 can be obtained.

It is understood that if the lens 11 has axial chromatic aberrations between more than two rays, the more than two rays can also be used in the method.

It is understood that the above-described embodiments are intended to illustrate rather than limit the embodiment. Variations may be made to the embodiments and methods without departing from the spirit of the invention. Accordingly, it is appropriate that the appended claims be construed broadly and in a manner consistent with the scope of the embodiment.

What is claimed is:

1. An apparatus for detecting a movement direction of an object, the apparatus comprising:

a lens having an axial chromatic aberration between a first ray and a second ray, the second ray having a wavelength greater than a wavelength of the first ray, the lens configured for converging the first and second rays from the object;

an image sensor having a flat sensing surface spaced a distance from the lens for receiving the converged first and second rays, the image sensor being capable of forming the converged first and second rays into a first ray image and a second ray image associated with the object respectively, and converting the first and second ray images into a first electronic image signal and a second electronic image signal respectively; and an image processor electrically connected to the image sensor and configured for comparing image quality of the first and second image signals, and analyzing whether the object is closer to an object plane associated with the first ray or closer to an object plane associated with the second ray when the object moves to different positions using a principle that the higher degree of clarity of the first ray image or the second ray image, the closer the object to the object plane associated with the corresponding first ray or second ray, and determining the movement direction of the object based on the analyzed positions of the object relative to the object plane associated with the first ray and the object plane associated with the second ray.

2. A method for detecting a movement direction of an object, the method comprising:

providing a converging lens, the converging lens having an axial chromatic aberration between a first ray and a second ray, the second ray having a wavelength greater than that of the first ray, the converging lens configured for converging the first ray and the second ray from an object;

forming a first ray image associated with the object corresponding to the first ray and a second ray image associated with object corresponding to the second ray using an image sensor when the object moves to different positions;

analyzing image quality of the first ray image and the second ray image to determine if the object is more closer to an object plane associated with the first ray or closer to an object plane associated with the second ray; and determining the movement direction of the object based on the analyzed positions of the object relative to the object plane associated with the first ray and the object plane associated with the second ray;

wherein the analyzing step is carried out using a principle that the higher degree of clarity of the first ray image or the second ray image, the closer the object to the object plane associated with the corresponding first ray or second ray.

3. The method as described in claim 2, wherein the image sensor has a flat sensing surface facing the converging lens, and the flat sensing surface is configured for receiving the first and second rays.

4. The method as described in claim 2, wherein the image sensor converts the first and second ray images into a first and a second electronic image signals respectively, and the analyzing step is performed using an image processor electrically connected to the image sensor.

* * * * *